(No Model.)
C. C. LEIWENICH.
DUST AND OIL GUARD FOR CAR WHEELS.
No. 498,176. Patented May 23, 1893.
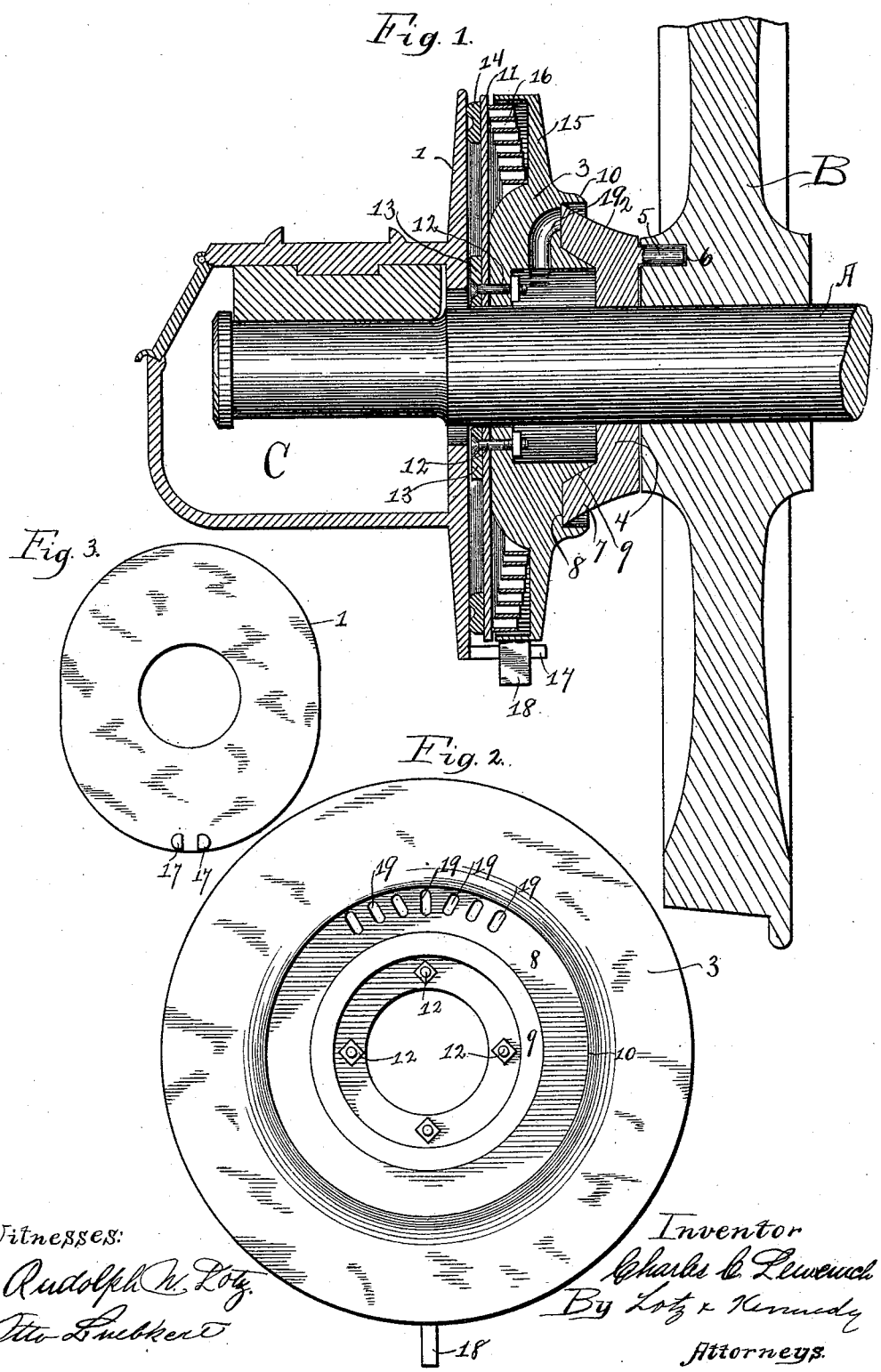

UNITED STATES PATENT OFFICE.

CHARLES C. LEIWENICH, OF CHICAGO, ILLINOIS.

DUST AND OIL GUARD FOR CAR-WHEELS.

SPECIFICATION forming part of Letters Patent No. 498,176, dated May 23, 1893.

Application filed November 19, 1892. Serial No. 452,596. (No model.)

*To all whom it may concern:*

Be it known that I, CHARLES C. LEIWENICH, a citizen of the United States, residing at Chicago, in the county of Cook and State of Illinois, have invented certain new and useful Improvements in Dust and Oil Guards for Car-Wheels; and I do hereby declare the following to be a full, clear, and exact description of the invention, such as will enable others skilled in the art to which it appertains to make and use the same.

This invention relates to a novel construction in dust and oil guards for car axles, the object being to provide a device of this description that will effectually prevent the escape of oil from the lubricator box of the axle and also prevent the entrance of dust or oil therein.

The invention consists in the features of construction and combinations of parts hereinafter fully described and specifically claimed.

In the accompanying drawings illustrating my invention,—Figure 1 is a vertical sectional view of a car axle and journal-box provided with devices constructed in accordance with my invention. Figs. 2 and 3 are detail views.

Referring now to said drawings, A indicates the axle, B the wheel and C the journal-box. These parts are constructed in a familiar manner, and my improved devices are located around the axle A between the rear end of the journal-box C and the adjacent face of the wheel B. It will, of course, be noted that the opening in the rear end of the journal-box C through which the axle passes is somewhat larger than said axle, and it is through this opening that the lubricant usually escapes or dust and dirt enter said journal-box, both of which of course are objectionable.

As before stated my improved devices are located between the wheel and journal-box and serve to form a tight joint between such parts to prevent the escape of oil that may leave the journal-box. The said journal-box is provided at its rear end with a plate or flange 1 the face view of which is shown on a smaller scale in Fig. 3, and it will be noted that this flange is slightly elliptical or is larger than it is wide, which shape is given to it to compensate for the movement of the parts carried by the axle. The said guard comprises essentially two parts, namely, a rotating member 2 that turns with the wheel and axle, and a stationary member 3 that is prevented from turning by its connection with the flange of the journal-box. The said member 2 has a hub portion 4 that fits upon the axle A closely to form a tight joint therewith to prevent the passage of oil between such parts, and the said joint can be obtained in any convenient manner, and to prevent the accidental turning of such rotating member with relation to the wheel and axle I provide such member with a pin 5 that enters an opening 6 in the wheel. The said rotating member 2 is provided with an overhanging flange 7 that extends toward the journal-box C. The non-rotating member 3 of the guard is provided with a circular opening through which the axle A passes, while the said member 3 is provided on its side adjacent to the member 2 with smooth faces 8 and 9 that encounter the smooth faces of the overhanging flange 7 of the member 2, and said member 3 is further provided with an annular flange 10 that overhangs the joint between said members 2 and 3 to protect the same, as clearly shown in Fig. 1. The meeting faces of the two members are ground to provide a tight joint between these parts.

To the hub portion of the non-rotating portion 3, I secure a packing washer or disk 11 conveniently by rivets 12 which pass through said parts and through a metallic ring 13 on the other side of said packing ring 11 so as to securely hold these parts together and prevent the entrance of oil or dust between the ring 11 and member 3. The said ring 11 can be made of any suitable flexible packing material, such as leather, and is provided near its periphery and on its face adjacent to the flange 1 of the journal-box with annular ribs or projections 14 preferably made of rubber and secured thereto in any convenient manner. The said non-rotating member 3 is provided with an outwardly extending bent or angular portion 15 which provides a seat or socket for a spring 16. The said seat 15 is made by a straight flange provided at its outer edge with an overhanging flange extending toward the ring or washer 11 and about even with the periphery of the same, and while of course it is obvious that various kinds of springs can be employed, yet I prefer to employ a flat, spiral spring which is so constructed as to act by lateral expansion, so that while the core of the spring presses against the member 3 yet the outer portion of the spring will exert a tension in the opposite direction against the outer portion of the washer 11, thereby serving to keep the rubber corrugations or ribs 14 in close contact with the inner face of the flange 1 of the journal-box which will obviously prevent the escape of oil therethrough. The spring serves also to keep the two members 2 and 3 of the guard in close contact, which will be clearly seen, and thus prevent at all times the escape of oil between such parts, and will further serve to take up any wear that occurs between these two parts, while the flexible washer 11 will prevent the relative movement of the parts.

To prevent the rotation of the member 3 I provide upon the flange 1, at the lower end thereof, two fingers 17 which project inwardly toward the member 3 and are adapted to receive between them a tongue 18 on the seat portion 15 of said member, that being located between said fingers will prevent the movement of said member 3 and will at the same time allow the relative vertical movement of said parts.

It will be noted that the lubricator working in from the journal-box may enter the joint between the two members, and to prevent the escape of such oil I provide in the smooth face 8 of the member 3 a series of openings 19 that lead from the face 8 backwardly through the member 3 and to the inner face of the same, so that any oil or lubricant working in between the members 2 and 3 will be caught by these openings and returned to the space between the members and the axle. I have found that by making these openings otherwise than radial they will serve to more effectually collect the lubricant, and in Fig. 2 I have shown the arrangement which I have adopted which shows the openings arranged tangentially, and I have shown part of said openings arranged at an opposite angle to the other so that they will always act when the wheel is returning in either direction.

It will be seen from the foregoing description that the escape of oil is effectually prevented, for any that may pass through the opening in the rear end of the journal-box will be retained between the guard members and the axle, as every means of escape is closed, as has been clearly pointed out, and it will be further noted that I have provided a guard of simple and durable construction that will always be held in its operative positions.

I do not, of course, wish to confine myself to the exact shapes and constructions of the parts shown, as I contemplate varying them without departing from the appended claims.

I claim as my invention—

1. The combination with an axle and journal box therefor, of a non-rotating member 3 provided with a flexible washer located between said member 3 and the journal box, a spring located between said member 3 and said flexible washer, and a non-rotating member 2 secured to said axle and having smooth faces encountering corresponding faces on said non-rotating member 3, substantially as described.

2. The combination with an axle and a journal-box therefor, of a non-rotating member 3 carrying a flexible washer 11 on its face adjacent said journal-box to provide a tight joint between said parts, and a rotating member 2 secured to said axle and having smooth faces encountering corresponding faces on said non-rotating member 3, substantially as described.

3. The combination with an axle and a journal-box therefor having a flange 1 at its rear end, of a non-rotating member 3 secured to said journal-box and provided with a flexible washer 11 on its side adjacent to said flange, ribs or corrugations 14 on the outer face of said washer to encounter said flange 1, a spring 16 located between said washer 11 and the seat 15 on said non-rotating member 3 and acting by lateral expansion, and a rotating member 2 secured to said axle and having smooth faces encountering corresponding smooth faces on said non-rotating member 3, substantially as described.

4. The combination with an axle and a journal-box therefor, of a guard comprising a non-rotating member 3 having a tight joint with the journal-box, and a rotating member 2 secured to the axle and having smooth faces encountering the corresponding smooth faces of the member 3, and passages in said member 3 leading from the said smooth faces to the inner portion of the member, substantially as described.

5. The combination with an axle and a journal-box therefor, of a guard comprising a member 3 having a tight joint with the journal-box and provided at its lower end with a tongue 18 located between fingers 17 of said journal-box, and a rotating member 2 secured to said axle having smooth faces encountering corresponding smooth faces on said member 3, substantially as described.

In testimony whereof I affix my signature in presence of two witnesses.

CHARLES C. LEIWENICH.

Witnesses:
HARRY COBB KENNEDY,
RUDOLPH W. LOTZ.